Nov. 18, 1969  C. D. BUCK  3,479,475
SAFETY SWITCH
Filed March 16, 1967
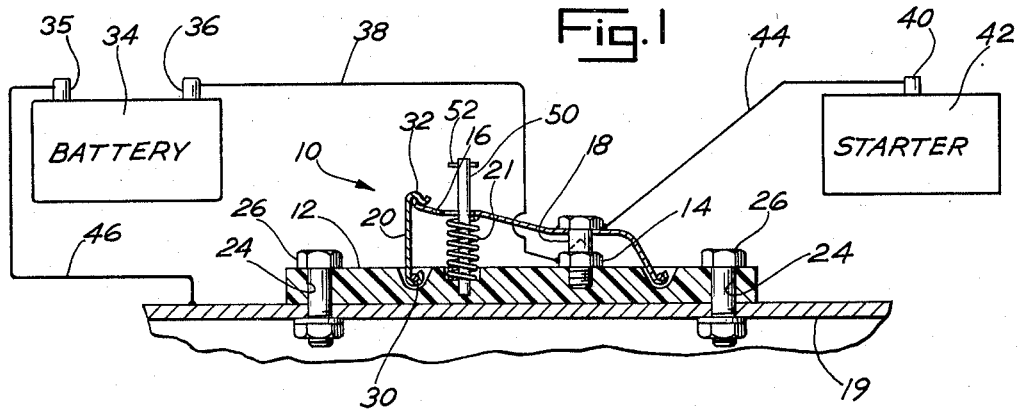
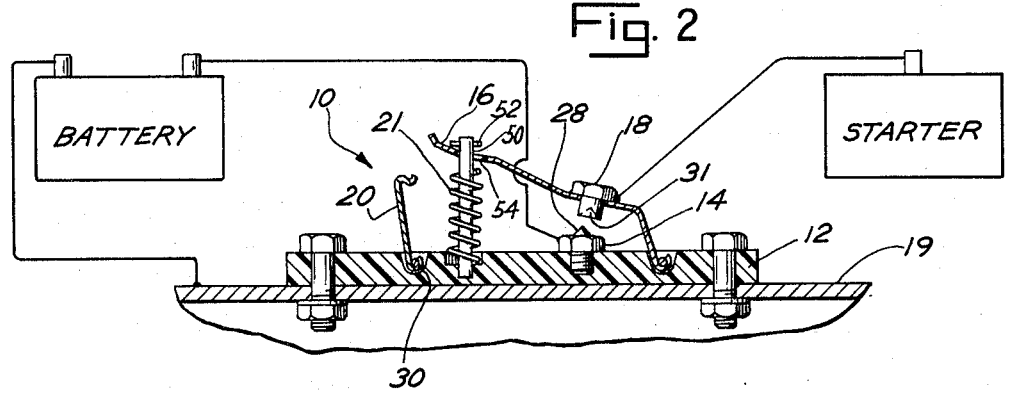
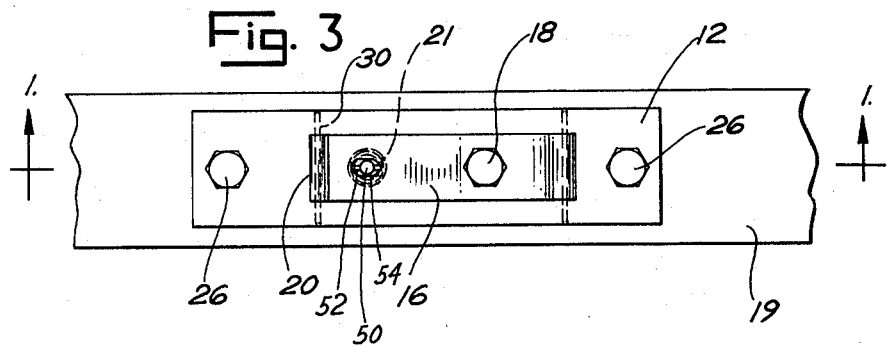
INVENTOR.
CHARLES D. BUCK
BY
Dominik, Stein & Knechtel
ATTORNEYS

United States Patent Office 3,479,475
Patented Nov. 18, 1969

3,479,475
SAFETY SWITCH
Charles D. Buck, 8113 N. Manhattan Ave.,
Tampa, Fla. 33614
Filed Mar. 16, 1967, Ser. No. 623,753
Int. Cl. H01h 35/02
U.S. Cl. 200—61.45        7 Claims

ABSTRACT OF THE DISCLOSURE

A safety switch which includes, generally, a base, a contact affixed to the base, a contact bar, a contact affixed to the contact bar, a contact bar lock, and biasing means. The contact bar is affixed at one of its ends to the base and is normally bent or tensed to releasably lock its other end with the contact bar lock. In this position, the two contacts are closed and effective to maintain the ignition system operative. If the vehicle in which the safety switch is installed is struck with sufficient force, such as would generally occur in an accident, the contact bar is released from the contact bar lock and opens the two contacts, partly as a result of its own stressed configuration and partly by the action of the biasing means. When the two contacts are opened, the ignition system is rendered inoperative.

---

This invention relates to safety switches and, in particular, to safety switches for use with motor-driven vehicles, such as automobiles, for automatically cutting off the ignition thereof in the event of an accident.

Each year numerous people are burned to death and asphyxiated from carbon monoxide in motor driven vehicles. Many of these deaths occur as a result of relatively minor accidents, and could have been easily prevented. For example, there have been many cases where a driver of an automobile falls asleep at the wheel, or loses control of it, and runs off of the highway. The automobile is not seriously damaged, and its motor continues running. The driver also is not seriously injured, but in some fashion, he is rendered unconscious. Normally, he would regain consciousness but, at the time of the accident, the windows were rolled up and the exhaust system for the vehicle is defective. The latter may have occurred when the automobile ran off the highway. Carbon monoxide seeps into the automobile and the driver is asphyxiated before he regains consciousness. In other cases, spilled gasoline is ignited by the still operative ignition system, and the driver is burned to death before he can be removed from the vehicle.

It is apparent that such types of accidents can be easily prevented, simply by providing some means for turning off the ignition system should the automobile be involved in an accident, so that its motor does not continue to operate.

Presently, there are numerous ignition switches available for rendering the automobile inoperative. None of these, however, are effective or automatically operated to cut off the ignition in the case of an accident. They are primarily "theft prevention" devices which are manually operated to render the automobile inoperative.

Accordingly, it is an object of the present invention to provide improved safety switches, for automatically cutting off the ignition system of a motor-driven vehicle in the event of an accident.

Another object is to provide improved safety switches of the above-mentioned type which can be reset.

Still another object of the invention is to provide improved safety switches of the above type which can be easily installed, either during assembly of the vehicle or thereafter as an accessory.

A still further object is to provide improved safety switches of the above type which are relatively simple in construction, and are inexpensive to manufacture and assemble.

Other objects of the invention will in part be obvious and will in part appear hereinafter.

The above objectives are accomplished with a safety switch which includes, generally, a base, a contact affixed to the base, a contact bar, a contact affixed to the contact bar, a contact bar lock, and biasing means. The contact bar is affixed at one of its ends to the base and is normally bent or tensed to releasably lock its other end with the contact bar lock. In this position, the two contacts are closed and effective to maintain the ignition system of the motor-driven vehicle operative. If the vehicle is struck with sufficient force, such as would generally occur in an accident, the contact bar is released from the contact bar lock and opens the two contacts, partly as a result of its own tensed configuration and partly by the action of the biasing means. When the two contacts are opened, the ignition system is rendered inoperative.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing; in which:

FIG. 1 is a sectional view of a safety switch exemplary of the invention, illustrating its construction and the manner in which it is generally opertaively coupled into the ignition system of a motor-driven vehicle;

FIG. 2 is a corresponding sectional view of the safety switch, illustrating the safety switch in a position which renders the ignition system inoperative; and FIG. 3 is a top plan view of the safety switch of FIGS. 1 and 2.

Similar reference characters refer to similar parts throughout the several views of the drawing.

Referring now to the drawing, there is illustrated a safety switch 10 including a base 12, a contact 14 affixed to the base 12, a contact bar 16 which is affixed at one of its ends to the base 12, a contact 18 affixed to the contact bar 16, a contact bar lock 20, and biasing means 21 which may be a coil spring, as illustrated. The contacts 14 and 18 are coupled into the ignition circuitry of a motor-driven vehicle, as described more fully below. Normally, the free end of the contact bar 16 is releasably locked with a contact bar lock 20 and, in this position, the contact 18 affixed to the contact bar 16 engages the contact 14 to render the ignition circuitry operative. If the vehicle is struck with sufficient force, such as would occur when the vehicle is involved in an accident, the contact bar lock 20 automatically releases the end of the contact bar 16. When this occurs, the contacts 14 and 18 open and thereby render the ignition circuitry inoperative so that the vehicle's motor is turned off. The possibility of a person in the vehicle being asphyxiated or burned is therefore eliminated. To again render the ignition circuitry operative, it is only necessary to close the contacts 14 and 18, by again lockingly engaging the end of the contact bar 16 with the contact bar lock 20.

More specifically, the base 12 is of a non-conductive material, such as nylon or plastic, and preferably has apertures 24 in it for receiving bolts 26 or the like for affixing it to, for example, the frame 19 of a vehicle. In the illustrated case, the base 12 is rectangular-shaped, however, other shapes can be used also.

The contact bar 16 is formed from a length of spring steel and its one end is affixed to the base 12 so that the contact bar is partly bent or flexed when its end is locked with the contact bar lock 20. With this arrangement, the contact bar 16 will unflex, or straighten, when its end is released from the contact bar lock 20, thereby opening the contacts 14 and 18.

The contact bar lock 20 also is formed from a length of spring steel, and its one end is pivotally affixed by means of a pivot pin 30 to the base 12. Its free end is bent so as to form a hook 32 beneath which the end of the contact bar 16 can be lockingly engaged. The resiliency of the contact bar 16 is normally sufficient to lockingly engage its end with the hook 32, however, the coil spring or biasing means 21 is preferably affixed to the base 12 beneath the contact bar 16 so as to normally bias the end of the contact bar in engagement with the hook 32. With this arrangement, there is less likelihood that the contact bar 16 will be accidentally released and, furthermore, that the contacts 14 and 18 will be broken when the end of the contact bar is released from engagement with the contact bar lock 20.

The contact 14 has a cone-shaped tip 28 (FIG. 2) on its end, and the contact 18 has a correspondingly shaped cavity 31 (FIG. 2) in its end in which the tip 28 can seat. Other types of contacts can be used, however, contacts having the above-described construction are preferred, since they provide more contact surface. Also, there is less likelihood that the contacts will arc or become separated, since one firmly seats within the other.

When installed within the vehicle, the contacts 14 and 18 are connected in series in the ignition circuitry which, in the illustrated example, is simply schematically illustrated by coupling the terminal 36 of the vehicle's battery 34 to the contact 14, by means of a conductor 38. The contact 18 is coupled to a contact 40 of the vehicle starter 42, by means of a conductor 44. The other terminal 35 of the battery 34 is grounded by, for example, connecting it to the frame 19 of the vehicle, by means of a conductor 46. For simplicity, the rest of the ignition circuitry is not shown.

When the safety switch 10 is installed in a vehicle, the end of the contact bar 16 is releasably locked with the hook 32 on the end of the contact bar lock 20, as illustrated in FIG. 1. As indicated above, in this position, the contacts 14 and 18 are normally closed and thereby maintain the ignition circuitry of the motor driven-vehicle operative. If the vehicle is in an accident or struck with sufficient force, the end of the contact bar 16 is released from engagement with the hook 32 of the contact bar lock 20. When this occurs, as illustrated in FIG. 2, the contact bar 16 due to its own normally stressed configuration springs upwardly to open the contacts 14 and 18, thereby rendering the ignition circuitry inoperative. The coil spring 21 also forcibly urges the bar contact 16 to an inoperative position, when its end is released from the contact bar lock 20. With the ignition system inoperative, the vehicle's motor is automatically turned off thereby eliminating the possibility of the driver of the vehicle being asphyxiated, from carbon monoxide, or burned.

To again render the ignition circuitry of the vehicle operative, the contact bar 16 of the safety switch 10 is merely again lockingly engaged with the contact bar lock 20 so as to close the contacts 14 and 18. Accordingly, it can be seen that the safety switch 10 can be easily reset and is not destroyed once it has been activated.

A guide pin 50 is advantageously threadedly affixed to the base 12 in a vertically disposed position so as to extend through the spring 21 and an aperture 54 in the contact bar 16. A cotter pin 52 or the like is extended through the guide pin 50, above the contact bar 16. The guide pin 50 maintains the spring 21 in a vertically disposed position beneath the contact bar 16 and further prevents the contact bar 16 from slipping sideways and making contact after it has been released.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A safety switch for automatically rendering the ignition circuitry of a motor driven vehicle inoperative in the event the vehicle is involved in an accident comprising: a base attached to said vehicle; a contact bar lock member affixed to said base; a contact bar member affixed to said base; shock responsive means for interlocking said members and for releasing them whenever a substantial shock is received by the vehicle as in an accident; said shock responsive means consisting of a U-shaped tip and biasing means for biasing the members into a releasably locked arrangement; a pair of contacts which are normally closed when said contact bar is releasably locked with said contact bar lock; said pair of contacts when closed maintaining the ignition circuitry of the vehicle operative; and said contact bar when released opening said pair of contacts to thereby render the ignition circuitry inoperative.

2. A safety switch as claimed in claim 1 wherein one of said contacts is affixed to said base and the other one of said contacts is affixed to said contact bar.

3. A safety switch as claimed in claim 2, wherein one of said contacts has a cone-shaped tip on its end and the other one of said contacts has a correspondingly shaped cavity in its end in which the cone-shaped tip can seat.

4. The safety switch of claim 3 wherein said contact bar lock and said contact bar are pivoted to said base, the other end of said contact bar lock having the U-shaped tip, said other end of said contact bar having the tip-end adapted to extend into the curvature of said U-shaped tip.

5. A safety switch, as claimed in claim 3 wherein said biasing means comprises a coil spring.

6. A safety switch, as claimed in claim 5, wherein the biasing means further includes said contact bar being formed of a length of spring steel stock and is normally stressed when its end is releasably locked with said contact bar lock.

7. A safety switch, as claimed in claim 6, further including guide pin means affixed to said base and being vertically disposed to extend through said contact bar and said coil spring.

References Cited

UNITED STATES PATENTS

| | | | |
|---|---|---|---|
| 3,014,106 | 12/1961 | Jennings. | |
| 3,243,562 | 3/1966 | O'Brien | 200—166.1 |
| 3,270,159 | 8/1966 | Soos | 200—61.45 X |
| 3,333,073 | 7/1967 | Ohlson | 200—61.45 |

ROBERT K. SCHAEFER, Primary Examiner

R. A. VANDERHYE, Assistant Examiner

U.S. Cl. X.R.

200—61.5, 166.1